(12) United States Patent
Yang et al.

(10) Patent No.: US 7,064,792 B2
(45) Date of Patent: Jun. 20, 2006

(54) FORMAT CONVERSION

(75) Inventors: Chengda Yang, Auburndale, MA (US);
Kevin Manbeck, Cranston, RI (US);
Stuart Geman, Providence, RI (US);
Donald Geman, Amherst, MA (US)

(73) Assignee: MTI Film, LLC, Providence, RI (US)

( * ) Notice: Subject to any disclaimer, the term of this patent is extended or adjusted under 35 U.S.C. 154(b) by 621 days.

(21) Appl. No.: 09/821,778

(22) Filed: Mar. 29, 2001

(65) Prior Publication Data
US 2002/0021365 A1 Feb. 21, 2002

Related U.S. Application Data

(60) Provisional application No. 60/192,926, filed on Mar. 29, 2000.

(51) Int. Cl.
*H04N 7/01* (2006.01)
*H04N 11/20* (2006.01)

(52) U.S. Cl. ........................ 348/445; 348/458
(58) Field of Classification Search ............... 348/458, 348/459, 441, 448, 561, 562, 576, 577, 581, 348/556, 445; H04N 11/20, 7/01
See application file for complete search history.

(56) References Cited

U.S. PATENT DOCUMENTS

| 4,653,013 A | | 3/1987 | Collins et al. ............... 364/518 |
|---|---|---|---|
| 4,774,572 A | * | 9/1988 | Kellar et al. ................ 348/441 |
| 5,054,100 A | | 10/1991 | Tai ............................. 382/47 |
| 5,349,385 A | * | 9/1994 | Glenn ........................ 348/458 |
| 5,404,170 A | * | 4/1995 | Keating ..................... 348/443 |
| 5,621,470 A | * | 4/1997 | Sid-Ahmed ................ 348/448 |
| 5,793,433 A | * | 8/1998 | Kim et al. .................. 348/445 |

FOREIGN PATENT DOCUMENTS

| EP | 0798664 A2 | 10/1997 |
|---|---|---|
| EP | 1113389 A2 | 7/2001 |

OTHER PUBLICATIONS

EPO Search Report, dated Nov. 21, 2001, received Nov. 26, 2001.

* cited by examiner

*Primary Examiner*—Michael H. Lee
(74) *Attorney, Agent, or Firm*—Bromberg & Sunstein LLP

(57) ABSTRACT

A method and computer program product for reformatting at least a portion of a digital source image. The digital source image has a number of pixels defining an original format which is to be converted to a destination image in a new format having a number of pixels. The number of pixels of the new format is greater than the number of pixels in the original format. A gradient is estimated at a point within a window which encompasses a plurality of intensity values from the source image. A polynomial is then used to determine a value for the point in the new format within the window. The polynomial is based in part upon the gradient. Values are then determined for additional points in the destination image by selecting a new window and repeating the acts of estimating a gradient and using a polynomial to determine a value.

27 Claims, 12 Drawing Sheets

G: THE POINTS(PIXELS) OF THE SOURCE IMAGE ARE REPRESENTED BY X's
G': THE POINTS(PIXELS) OF THE DESTINATION IMAGE ARE REPRESENTED BY 0's

| GRADIENT | | CLASS | POLYNOMIAL | WINDOW SIZE |
|---|---|---|---|---|
| MAGNITUDE | DIRECTION | | | |
| 1 | 1 | 1 | A+Bx | 2 |
| 1 | 2 | 2 | ⋮ | ⋮ |
| 1 | 3 | 3 | ⋮ | ⋮ |
| 1 | 4 | 4 | ⋮ | ⋮ |
| 2 | 1 | 5 | ⋮ | ⋮ |
| 2 | 2 | 6 | ⋮ | ⋮ |
| ⋮ | ⋮ | ⋮ | ⋮ | ⋮ |
| | | 16 | $A+Bx+Cy+Dx^2$ | 4 |

FIG. 9

FORMAT CONVERSION

PRIORITY

This application claims priority from U.S. Provisional Application entitled "Format Conversion" Ser. No. 60/192,926 filed Mar. 29, 2000, which is incorporated herein by reference in its entirety.

TECHNICAL FIELD

The present invention relates to digital images and more specifically to altering the format of digital image data from a first format to a second format.

BACKGROUND ART

In the video industry, there are a variety of digital video formats. One common digital video format is referred to in the art as "525". Such digital video has an active picture area of 720 columns and 486 rows wherein each point on the active picture area is defined by a pixel. There are 486 lines, each consisting of 720 intensities, typically in three colors each having a separate intensity value. This active area represents a 4×3 image in that the width of the image is 1.33 times its height. In particular, the pixels in "525" are non-square rectangles with aspect ratio $$\frac{4 \times 486}{3 \times 720} = 0.9.$$

In the video industry, it is often desirable to upconvert such images for High Definition ("HD") broadcasts and other HD applications. One HD format, known as "1080," has 1920 columns and 1080 rows, and represents a scene with aspect ratio 16/9. Since $$\frac{1920}{1080} = \frac{16}{9},$$

the pixels are square. In order to convert from "525" format to the "1080" format, it is necessary to "stretch" 720 columns into 1920 columns. Since the pixels are non-square in "525", an effective 16:9 scene is obtained by using only 364 of the 486 rows; in other words, in each of the 720 columns, 364 pixels are stretched into 1080 pixels. This approach fills up the HD image, but sacrifices some of the original image content, namely a horizontal strip of the original scene consisting of 486−264=122 lines. Another approach stretches the 486 rows of "525" into 1080 rows of "1080" format and stretches the 720 original columns into 1437 (=0.9*720*1080/486). Black mattes are placed on the left and right of the destination image in order to expand the image to 1920 columns, thus the entire screen of the display device is not fully utilized.

Other video applications not only require upconversion as with the "525" to "1080" conversion by also require downconversion. For example, in the case of computer animation, one might wish to convert a file of dimensions 1848×1101 to a universal video master of dimension 1920×1080. The 1848 columns are stretched to 1920 and the 1101 rows are squeezed to 1080. Whereas the pixels in the computer file are square, the resulting "1080" HD image is "anamorphic" (non-square pixels).

In order to determine what color (intensity) values a pixel should have once the aspect ratio has been normalized as described above, prior art systems have used a technique which is known in the art as "Nearest Neighbor." For each pixel (location) in the destination image, the nearest neighbor method finds the nearest pixel in the source image and copies the source intensity value (for each color separately) at that location to the destination pixel. This is an extremely fast approximation, but provides poor quality. For example, in the case of upconversion, an intensity value may be repeated many times, creating disturbing, uniform blocks.

Another prior art technique is known as bi-linear Interpolation. In bi-linear Interpolation for each pixel z in the destination image, the nearest four pixels, say $z_1$, $z_2$, $z_3$, $z_4$, are first found in the same field from the source image corresponding to the same instance in time. If the destination array has square pixels, then these four points form a square with z inside. The source intensity data is modeled for each color component with a bilinear function, $P(x,y)=A+Bx+Cy+Dxy$, of the two variables. The four coefficients A, B, C, D are determined by the four intensity values $I_s(z_1), \ldots, I_s(z_4)$ of the source image at the four nearest pixels. The intensity value selected for the destination image at $z=(u,v)$ is $P(u,v)$, where u and v are the coordinates of z in the common coordinate system of the source image in a first format and the destination image in a second format. Other prior art techniques improve upon the bi-linear technique such as bi-quadratic and bi-cubic. These techniques also rely on polynomials, however the polynomials have degrees two and three respectively. Additionally, the subset of pixels in the source image used to determine the coefficients of the polynomial is larger. For example, in the case of bi-quadratic interpolation, there are nine coefficients to estimate and hence, in the case of exact interpolation, nine pixel values in the source image are identified with each destination location. Other variations are possible in which the polynomials are not fitted exactly to the source data but rather provide only a smooth approximation. The quality is superior to bilinear approximation, but the amount of computation is far greater.

Although the prior art polynomial techniques allow for the creation of previously non-existant pixel values, these techniques encounter a prominent loss of sharpness due to the fact that image transitions and other high frequency structures are compromised due to filter over-smoothing. This can be readily visualized by considering a scan line of the original image which crosses a sharp boundary, such as would occur when one subject occludes another; the values along the scan line will typically have smooth sections joined by rather sharp transitions in which the image intensities change abruptly from one characteristic level to another. If the image is approximated by a low-order polynomial, these transitions will be overly smoothed. Visually, the new image appears to have fewer details and to be blurred as compared with the original. It is well-known that image transitions (edges and boundaries due to occulsion, shadowing, motion, etc.), carry a large portion of the information content, therefore this type of degradation poses a serious problem. Thus, a need exists for adaptive filtering in which the filtering is dependent upon the location within the source image, so as to reduce the amount of blurring caused by traditional interpolation or smoothing.

SUMMARY OF THE INVENTION

In a first embodiment of the invention there is provided a method and computer program product for format conversion of a digital image. In one embodiment of the invention, a digital image in an old format is converted to a converted image having a new format wherein the digital image and the converted image have the same reference system for describing the location of pixels. For example, a reference system may be the standard reference system used in the video industry in which pixels have an origin at the upper left hand corner of the image which designates pixel point (0,0). The digital image is having a plurality of digital data wherein there is digital data at each pixel location. An example of digital data is RGB (red, green, blue) values of each pixel. The digital image being converted has dimensions of length and width and a resulting aspect ratio.

The method as embodied normalizes the aspect ratio of the source image and the new format. As used in the following description and in the appended claims, the term "window" shall mean a collection of intensity values associated with pixels in the source image. A window is defined which contains a set of intensity values in the old format. A gradient is estimated for the window and a polynomial is selected based on the gradient in order to represent the intensity variation in the window. The order of the polynomial is larger in the direction of the gradient and smaller in the direction orthogonal to the gradient to avoid blurring at transitions in the destination image. Coefficients are calculated by solving a group of simultaneous equations using the known digital data to solve the equations. After the coefficients for the polynomial are calculated, the intensity values for the destination image pixels within the window can be determined dependent upon the polynomial values at those location. This process is continued by selecting different windows until all of the pixels within the converted image have associated digital data thus, adaptive filtering is accomplished.

In the preferred embodiment, it should be understood that the size and direction of the gradient of the digital data determines the polynomial type that is selected. As a result, each window will have its own polynomial type and coefficients In one embodiment after the pixels in the destination image have been assigned values, the values are recalculated based on polynomials from other proximate windows. By having multiple calculations for each point, a straight or weighted average of the points can be performed which then determines the final value of the digital data for the converted image.

BRIEF DESCRIPTION OF THE DRAWINGS

The foregoing features of the invention will be more readily understood by reference to the following detailed description, taken with reference to the accompanying drawings, in which:

FIG. 7 shows the mapping of points/pixels of the source image to points/pixels of the destination image;

FIG. 9 is an exemplary table showing the association between the gradient, the class of the gradient, the polynomial value and the window size;

DETAILED DESCRIPTION OF SPECIFIC EMBODIMENTS

Figure 1:
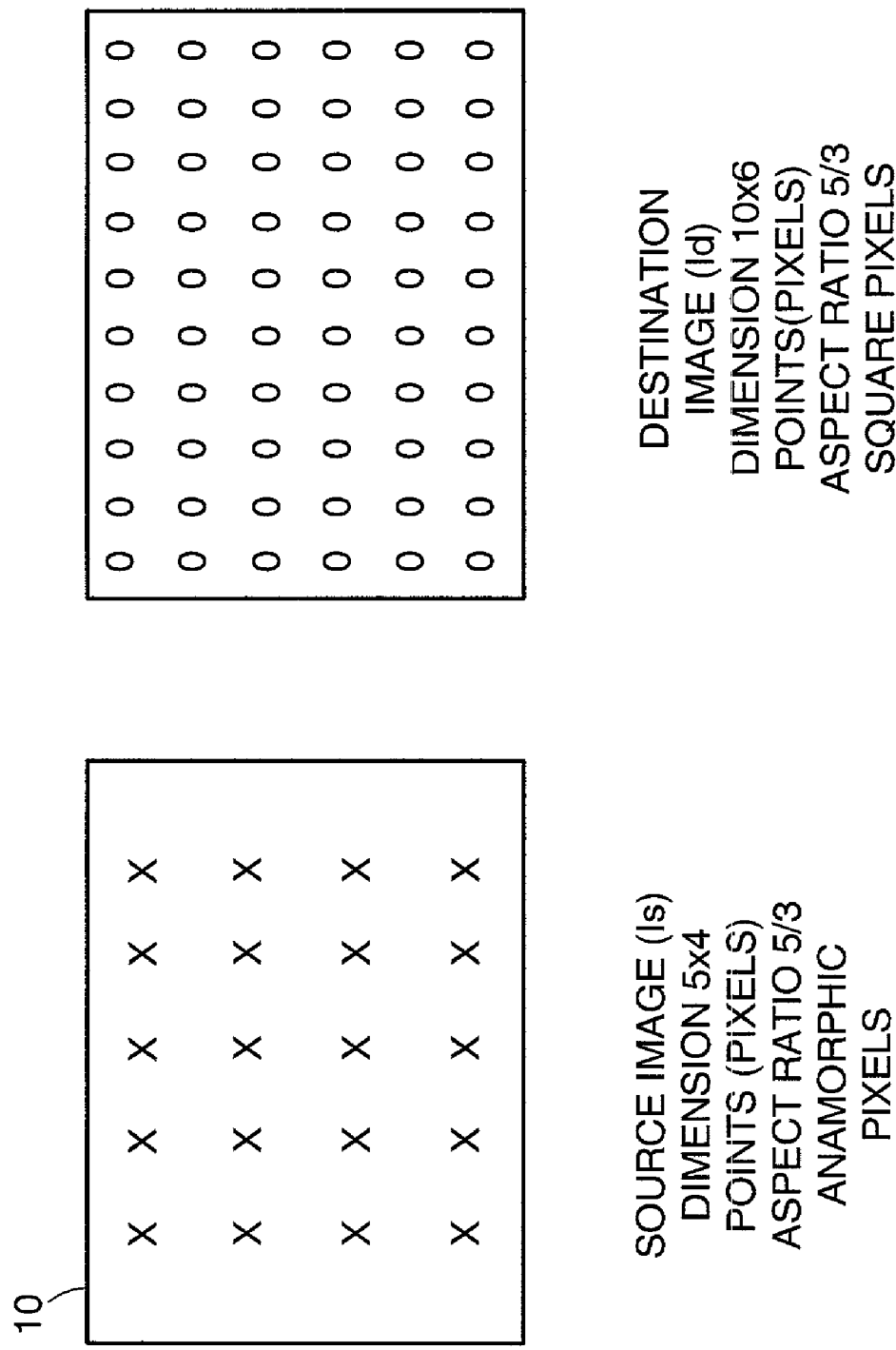
FIG. 1 is a block diagram showing pixels of both a source and a destination digital image.

Definitions. As used in this description and the accompanying claims, the following terms shall have the meanings indicated, unless the context otherwise requires:

The term "filtering" as used in the following claims and the disclosure shall imply to both interpolation and smoothing as is understood by those of ordinary skill in the art. The term "adaptive" as used in conjunction with the word "filtering" means that the filter changes dependent upon a characteristic of the source image. For example, the filter may vary depending upon the location within the source image or the filter may vary in direction, such that the filter is different in the x and y directions of the image as defined by a cartesian coordinate system or the filtering may vary in direction dependent upon some combination of x and y based upon the source image. "Pixels" refer to both a small, rectangular element of a picture and a grid point. Further, the term pixel may refer to the intensity values associated with a pixel grid point where the context requires. The location of a pixel is assumed to be its upper left hand corner as depicted in FIG. 1 by arrow 10. It should be understood by any one of ordinary skill in the art the two arrays, represented by the symbols "x" and "0" in FIG. 1, may have different overall dimensions, as well as different pixel shapes. For example, the number of "x"s and "0"s in each row and in each column may be different, and the row spacing between "x"s may be different from the row spacing between "0"s, and similarly for columns.

Figure 2:
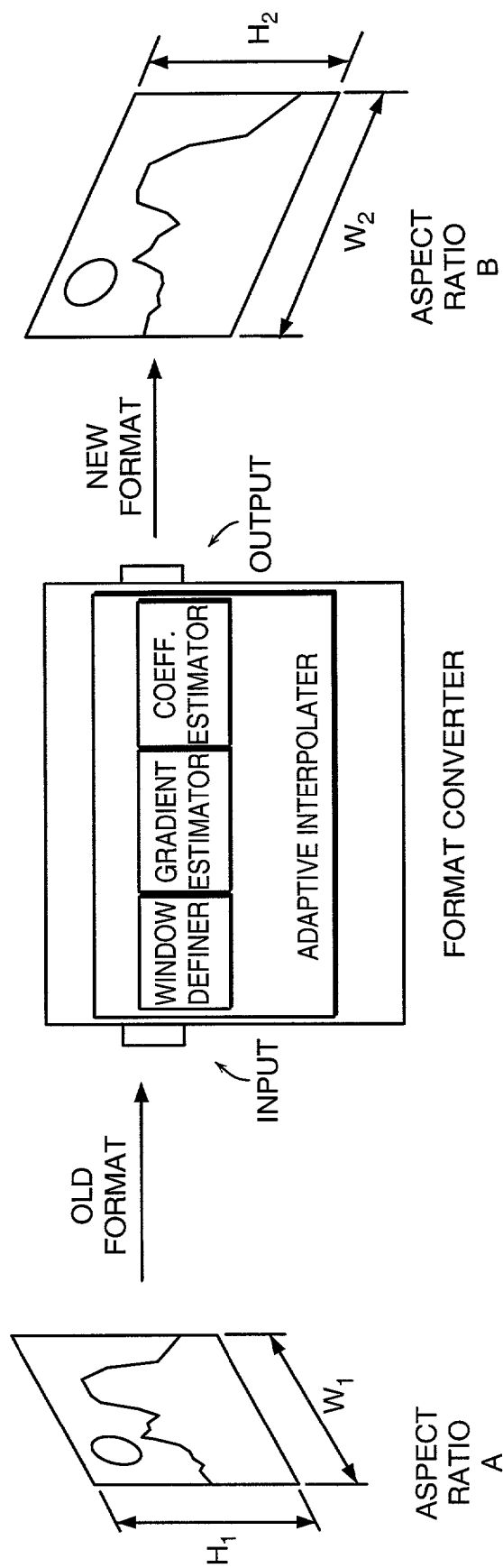
FIG. 2 is a block diagram showing a source image input into a format converter wherein the format converter uses adaptive filtering to produce a destination image.

FIG. 2 is a block diagram showing a source image having a defined aspect ratio and width W1 and height H1 being input into a format converter. The source image is composed of intensity values at discrete locations which define pixels within the source image. The format converter is an adaptive filter which contains an adaptive interpolator. The adaptive filter processes the intensity values from an old format to a new format of a destination image wherein in the preferred embodiment, the destination image has a higher resolution and an associated aspect ratio. In one embodiment, the adaptive filter is both anisotropic and space-variant. The adaptive interpolator uses three modules for determining intensity values for the new format based upon intensity values in the old format. First the aspect ratios of the source image and the destination image are normalized. After aspect ratio normalization, the first module which is a window definer defines a window of intensity values from the old format which are associated with location points (pixels) in the new format and wherein the window includes a point which has no value in the new format. From the intensity values within the window, a gradient is measured in a gradient module. From the gradient, based upon the magnitude and the direction of the gradient, a mathematical expression such as an ordered polynomial is selected. A coefficient estimator is then employed which determines the coefficients of the polynomial based again on intensity values from the old format which are placed in the new format and are local to a point in the new format which does not have an associated intensity value. Once the coefficients are estimated, the intensity value for the point in the new format which does not have associated intensity values is determined. This process continues for all points which do not have associated intensity values in the new format until a complete destination image is defined. This destination image is output and has an associated aspect ratio B and a width W2 and height H2.

Figure 3:
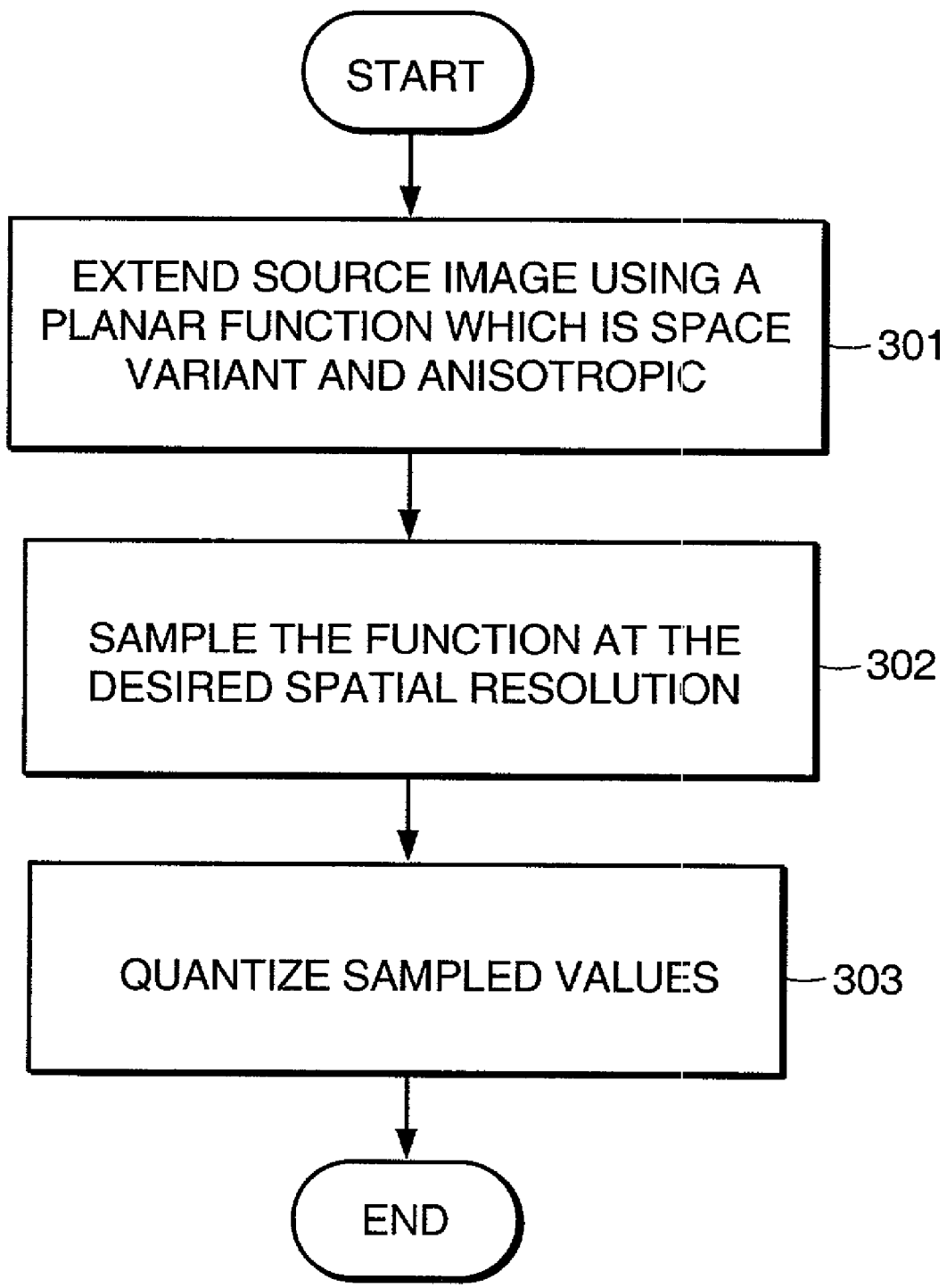
FIG. 3 is an exemplary flowchart for adaptive filtering.

FIG. 3 is a flow chart of the steps which are taken for converting the digital source image in a first (old) format to a destination image in a second (new) format. The destination image is constructed by first "extending" the source image, a function on a discrete, two-dimensional lattice, to a function defined over a portion of the plane wherein the function is both space variant and anisotropic such that the function defines an adaptive filter(Step 301). The function is then sampled at the desired spatial resolution (Step 302) and the sampled values are quantized (Step 303). As expressed above, the construction of the approximating planar function is adaptive in two ways. First, the planar function is a space-variant approximation such that the same type of polynomial approximation is not used throughout the image. Instead, the nature of the smoothing depends on the image location and the degree of the approximating polynomial utilized to define a destination value at a particular location depends on the local behavior of the source image at that location. Second, the planar function is anisotropic such that the approximating polynomials are not symmetric in degree in the vertical and horizontal directions, i.e., the smoothing is anisotropic rather than isotropic. At a given point, the amount of smoothing is less in the directions in which the intensity values change rapidly than in directions in which the intensity values are relatively stable. The local behavior of the intensity surface is characterized by the gradient, and the type of approximation is then based on the direction and magnitude of the gradient. The magnitude of the gradient determines the overall level of smoothing, with low magnitudes corresponding to high smoothing and low-order polynomial approximations. In addition, the amount of smoothing is less in the direction of the gradient then in the direction perpendicular to the gradient, thereby preserving image boundaries. The amount of smoothing refers to the degree of the approximating two-dimensional polynomial along the two axes. Thus the approximating polynomial has lower degree (is smoother) in the direction perpendicular to the gradient (the direction of the boundary) than in the direction of the gradient (the direction which crosses the boundary).

Figure 4:
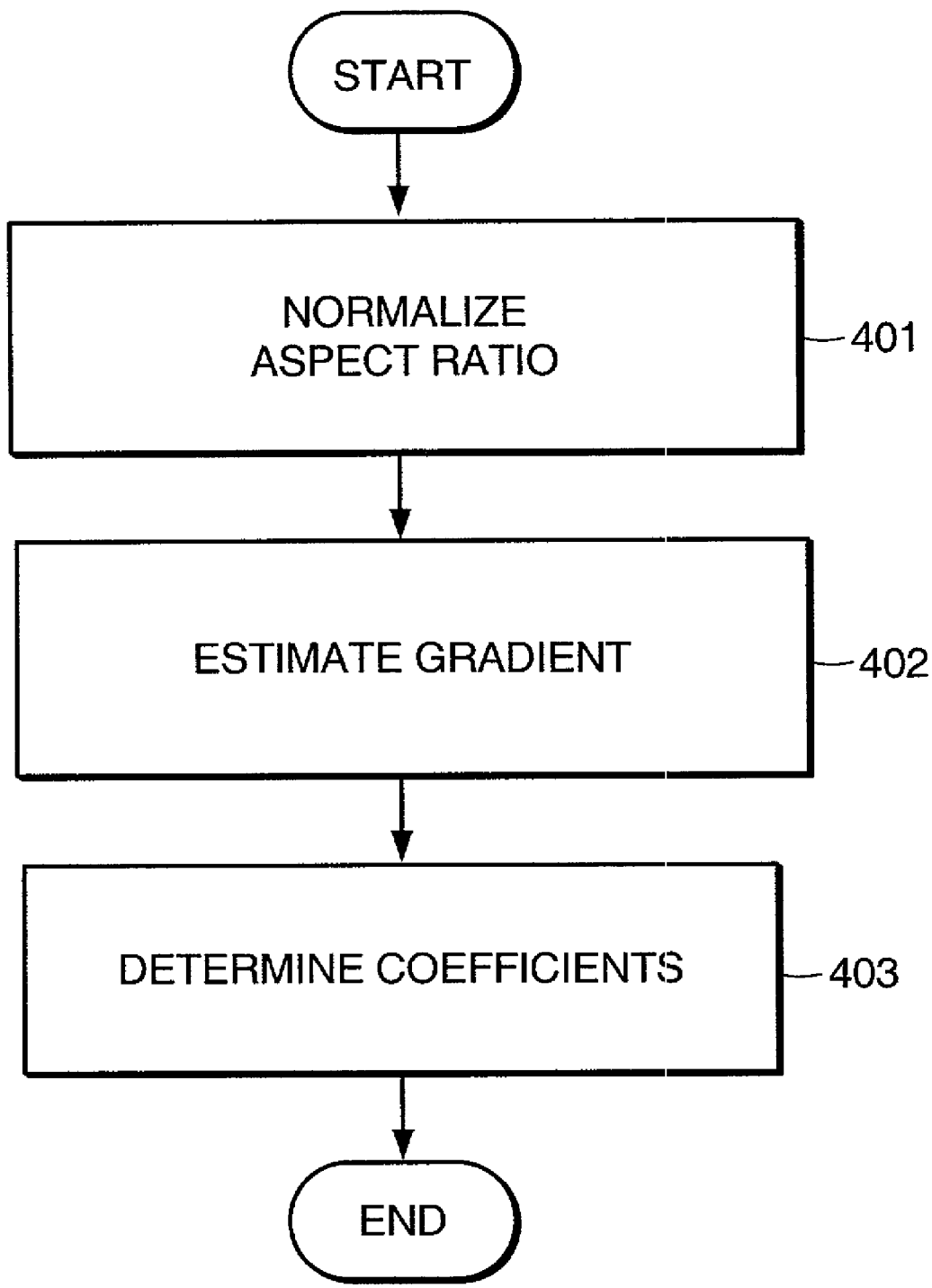
FIG. 4 is a flowchart elaborating on the elements of FIG. 3.
Figure 4A:
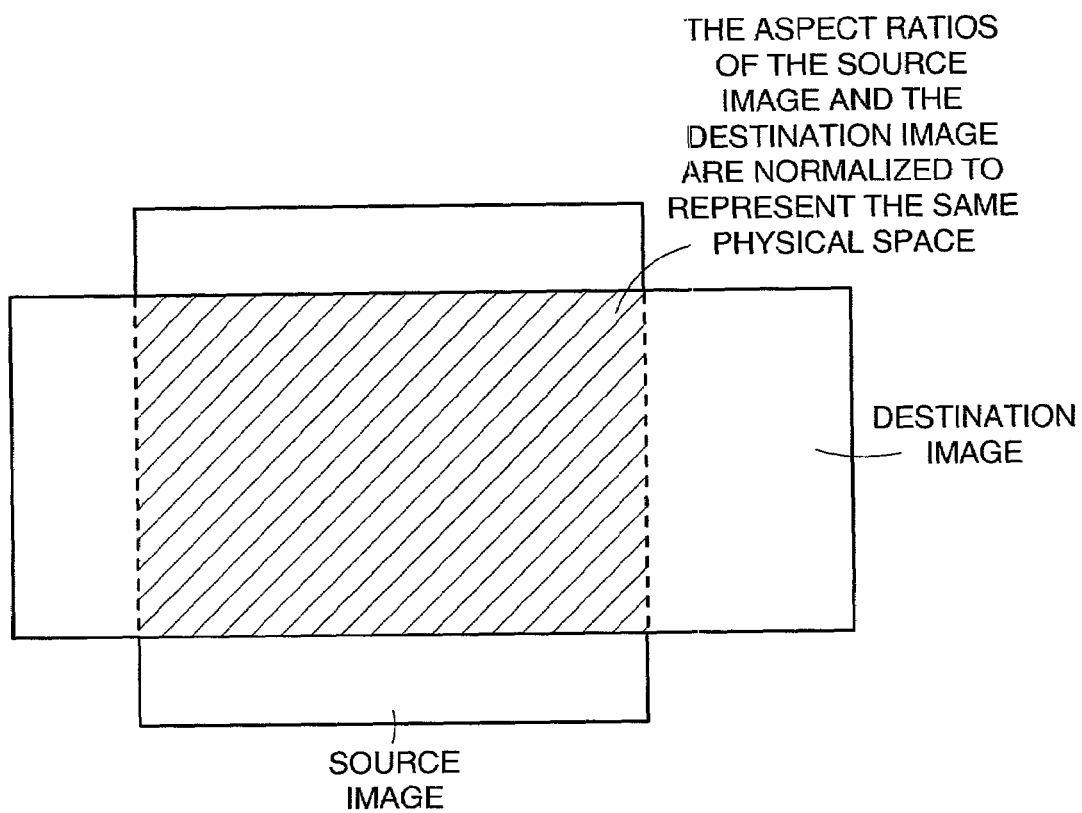
FIG. 4A is a block diagram showing a source and a destination image and the common physical space shared between the images.

FIG. 4 is a flow chart further elaborating on the step of extending from FIG. 3. First, the aspect ratio of the source and destination images are normalized such that the two pixel arrays represent the same physical space (step 401). FIG. 4A which shows a source image and a destination image and the common physical space which overlaps wherein the section of the source and destination image represents the same physical space. Once the points are fixed a gradient of the intensity values of the source image is determined by selecting a window in the old format encompassing the source image intensity values which also includes a point z from the new format for which intensity values are desired(step 402). Once the direction and magnitude of the gradient are determined a polynomial is selected (step 403). The coefficients of the polynomial are determined by solving a group of simultaneous equations. The intensity values of the source image are used in determining the coefficients (step 404). From the defined polynomial, point z within the initial window can be determined and the process can be continued for all points within the destination image for which intensity values need to be calculated. The described steps will be expressed in further detail below.

Figure 5:
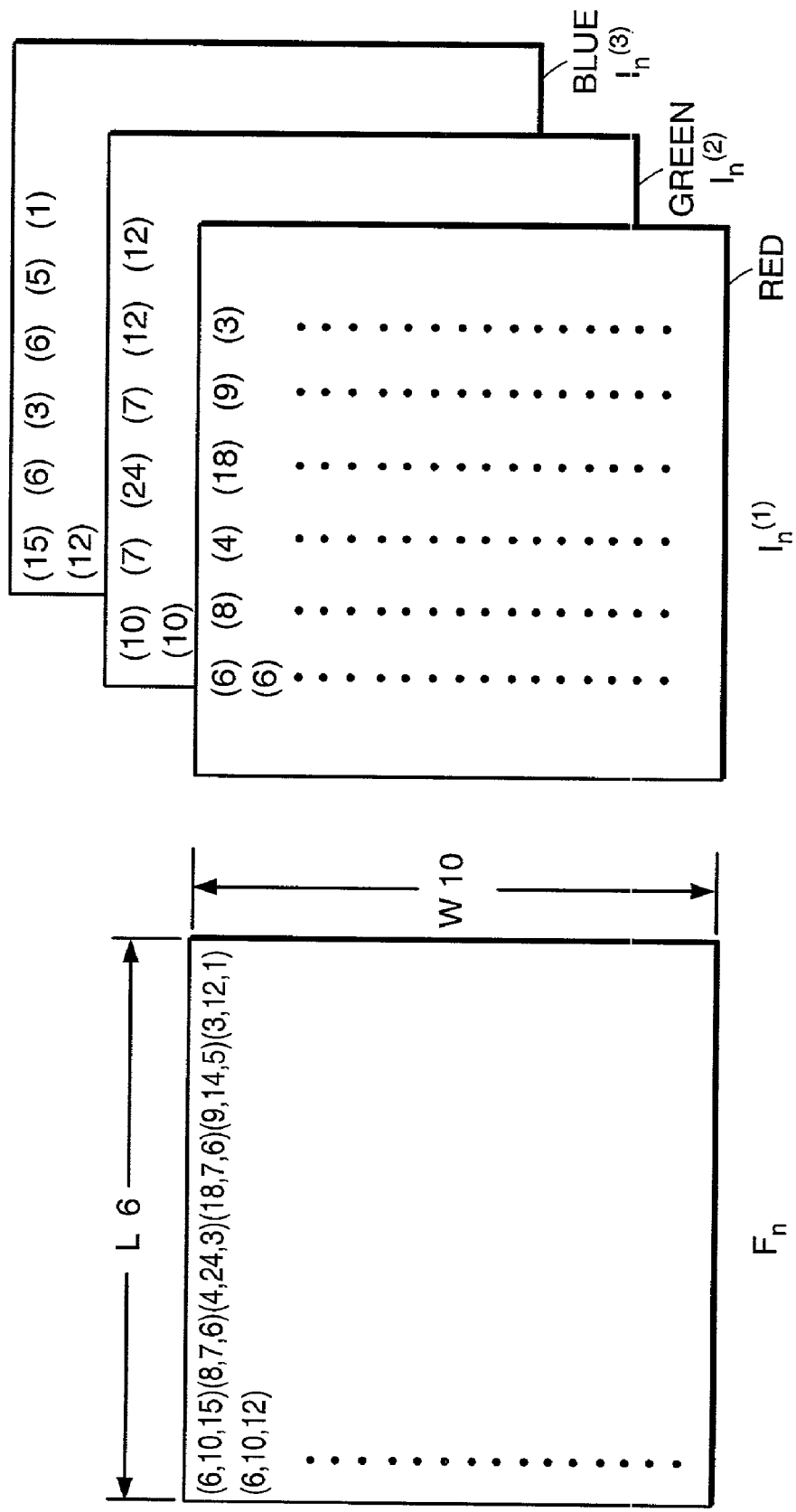
FIG. 5 is a block diagram showing a source image decomposed into three images, one for each color element.

The environment defining the digital video data of the source and destination images is defined in mathematical terms as follows. Let $F_1, F_2, \ldots$ represent the source sequence of digital video fields. Such the separation in the time between fields is one-sixtieth of a second, the total number of fields is sixty times the run length in seconds. In standard color video, each field $F_n$ consists of three images, say $(I_n^{(1)}, I_n^{(2)}, I_n^{(3)})$, whose physical meaning depends on the color coordinate system as shown in FIG. 5. Two typical choices are "red, green, blue" and one luminance and two chrominance values. The spatial resolution of each image $I_n^{(k)}$ is characterized by the number of columns C and rows R, referred to its "dimension" C×R, as well as the aspect ratio W/H which indicates the relative dimensions of the physical scene represented by image. For example, when W=16 and H=9, the scene is rectangular and the ratio of width-to-height is 16/9. Each of R rows contains C pixels, which are square if and only if C/R=W/H. Given the image dimensions, the aspect ratio determines the effective pixel shape $\delta_x \times \delta_y$, and vice versa, by the constraint $$\frac{C x \delta_x}{R x \delta_x} = \frac{W}{H}.$$

Given that the desired destination format is C' columns and R' rows, and an aspect ratio W'/H'. For each image, $I_n^{(k)}$, k=1,2,3, of each field $F_n$ to use exactly the same algorithm is used to reformat each image, therefore the following description describes one embodiment of the method for a single C×R image I and all indices referring to field numbers and color components are henceforth dropped.

The source image is an array of intensities defined over a regular, rectangular grid of points in the plane, denoted by $G=\{(x_i,y_j), 1 \leq i \leq C, 1 \leq j \leq R\}$. Thus there are C R points. Standard image coordinates are presumed, so that the point $(x_1,y_1)$, is at the upper left hand corner of the grid, the point $(x_1,y_2)$ is immediately below $(x_1,y_1)$, and the point $(x_1,y_R)$ is at the lower left hand corner. Point $(x_1,y_1)$, is the upper left hand corner of a pixel and the other three corners being $(x_i+1,y_j), (x_i,y_j+1)$ and $(x_i+1,y_j+1)$. The grid is assumed to be regular in the sense that the spacing is the same between any two adjacent grid points in any row; similarly, the spacing is the same between any two adjacent points in any column. However, the row and column spacing need not be the same, i.e., the pixels need not be square. The relative spacing between any two adjacent column points and any two adjacent row points conveys the shape of the pixels.

The new grid defining the new image has C' columns and R' rows, with an aspect ratio of W'/H'. The set of intensity values assigned to this new array is the reformatted, destination image; it represents one color component of one field in the reformatted digital video sequence. In general, the new grid G' has a different number of points (R'C' vs RC) and different spacings.

The destination image is in the same coordinate system as the source image wherein the two pixel arrays determine the same bounding rectangle. In fact, all methods for reformatting, in particular those discussed in the background make this assumption in order to perform smoothing or interpolation.

Figure 6:
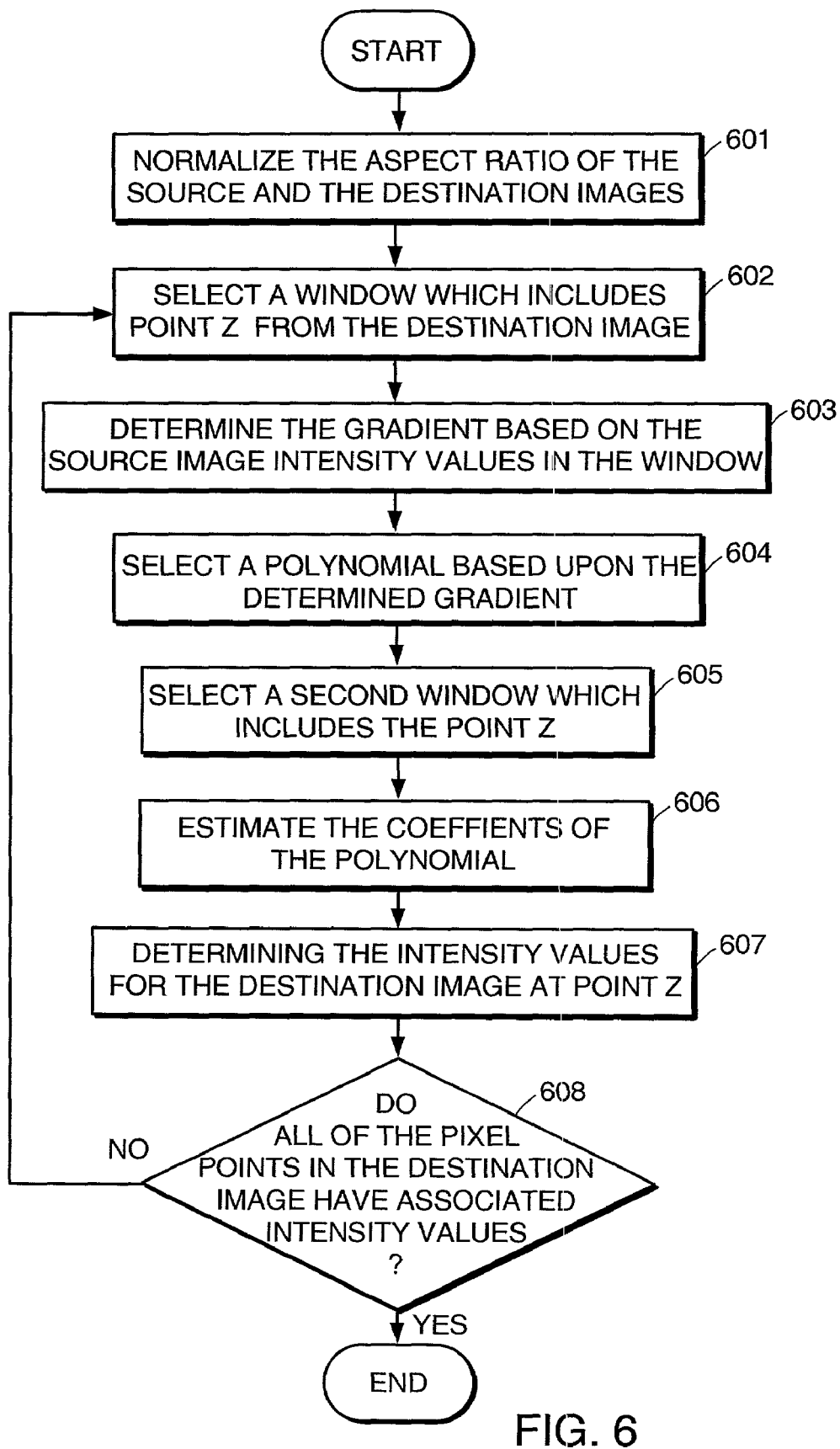
FIG. 6 is a flowchart providing additional detail to the flowchart of FIG. 4.

FIG. 6 is a flow chart expressing the steps of FIG. 4 in more detail. First the aspect ratio of the source and destination images is normalized (Step 601). For example, the case of converting from "525" to "1080", "525" has dimensions 720×486 and is nominally 4/3 whereas as "1080" is 1920×1080 and is nominally 16/9. It should be understood by one of ordinary skill in the art that various methods are known for aspect ratio normalization. For example, some of the original source material may be sacrificed, as in one scenario for converting from "525" to HD "1080", in which the source dimensions are reduced as was explained in the background section. Another manner of achieving normalization is to use all of the material in the original source image but sacrifice some of the material in the destination image. Other combinations are possible in which material is omitted in both images.

Once the aspect ratios are standardized, the destination image is represented by grid $G'=\{(x'_i,y'_j),1\leq i\leq C',1\leq j\leq R'\}$, which can be assumed to occupy the same region of the plane as G. For example, in FIG. 1, the right grid could be superimposed on the grid on the left as shown in FIG. 7. In FIG. 7 $\delta_x,\delta_y$ denote the spacing between columns and rows respectively in G and $\delta'_x,\delta'_y$ are the same quantities in G'. The pixels in G (respectively, G') are $\delta_x \times \delta_y$ (resp. $\delta'_x,\delta'_y$). The two grids have the same bounding rectangle, which has width $W=C\delta_x=C'\delta'_x$ and height $H=R\delta_y=R'\delta'_y$.

Let $I_s(i,j)$ denote the intensity data of the source image at pixel $(x_i,y_j)$ $\epsilon$G. The source intensity data are then $I_s=\{I_s(i,j)1\leq i\leq C,1\leq j\leq R\}$. Based on this, intensity values are assigned to each pixel $(x'_i,y'_j)\epsilon G'$. Let $I_d=\{I_d(i,j),1\leq i\leq C',1\leq j\leq R'\}$ denote the destination image.

A window $B_{gr}\subset G$ is defined for each pixel $z\epsilon G'$, roughly centered at z (Step 602). The source values $\{I_s(m,n),(x_m,y_n) \epsilon B_{gr}\}$ are used in order to estimate the gradient of $I_s$ at the location z (Step 603). The estimate of the gradient of $I_s$ at z, denoted $\nabla I_s(z)$, may be based on as few as three pixels in G. The three pixels form a triangle whose orientation depends on where z falls relative to the pixels in G. Let $(x_k,y_l)\epsilon G$ be the pixel location closest to z. There are four possible choices for the other two locations depending on which of the four quadrants that z lies in relative to $(x_k,y_l)$. For example, if the location is toward the upper left of z, then $B_{gr}=\{(x_k,y_l),(x_k+1,y_l),(x_k,y_l+1)\}$ and the estimated gradient is $$\nabla I_s(z)=(I_s(k+1,l)-I_s(k,j+1)-I_s(k,j)).$$

The formula defining the estimated gradient for the other three choices should be obvious to those of ordinary skill in the art.

In general z does not belong to G, the grid over which $I_s$ is defined. The estimated gradient determines the structure of the polynomial that will approximate $I_s$ in the vicinity of z. The choice of this polynomial is based on a pre-computed table which identifies one polynomial with each vector in a set of quantized (representative) gradients (Step 604). The structure of the polynomial is the set of non-zero coefficients. The representative polynomials are not necessarily symmetric, such as $P(x,y)=A+Bx+Cy$ or $P(x,y)=A+Bx+Cy+Dxy+Ex^2+Fy^2$. Instead, the amount of smoothing is smaller (i.e., the degree is larger) in general direction of the gradient than in the direction orthogonal to the gradient. Moreover, the amount of smoothing in both directions depends on the magnitude of the gradient. The larger the magnitude the less the amount of smoothing, thereby providing a relatively higher accuracy of approximation along directions of significant transition than elsewhere. For each $z\epsilon G'$, the coefficients of the chosen polynomial are estimated based on the source intensity values in another window $B_{ls}\subset G$, also roughly centered at z, and in general larger than $B_{gr}$ (Step 605). The size $N(B_{ls})$ of $B_{ls}$ depends on the number $N(P)$ of (non-zero) coefficients in the polynomial assigned to pixel z. Estimation of the coefficients is based on least-squares minimization (Step 606). In least-squares minimization, the disparity between the polynomial and the source data is the sum of the squared intensity differences at the points in $B_{ls}$. In the case of "smoothing", $N(P)<N(B_{ls})$ and in the case of "interpolation", $N(P)=N(B_{ls})$. For the least squares minimization there is a closed-form solution which is linear in the data. Once the polynomial is fully determined the intensity values of the destination image for pixel point z are determined (step 607). The process then continues until intensity values are determined for all pixel points in the destination image (Step 608).

The selected window $B_{gr}(z)$ which is a set of source pixels from G the lattice of the source image is only limited by the fact that it must contain the point z from the destination image and must have enough points proximate to z to estimate the gradient of $I_s$ at z. In the preferred embodiment, the choice would be space-variant, depending on the nature of the video material. One might desire a finer estimate (larger window) at "important" locations or when the data is noisy. A small window might suffice for relatively flat regions, such as a section of sky or wall in which the frequency of change of the intensity values is low, whereas a larger window might provide a better estimate near high-frequency structures. The examples provided below presume a non-space-varying window $B_{gr}$, but it should be understood by one of ordinary skill in the art that in the alternative a space-varying window could similiarly be implemented.

Figure 8:
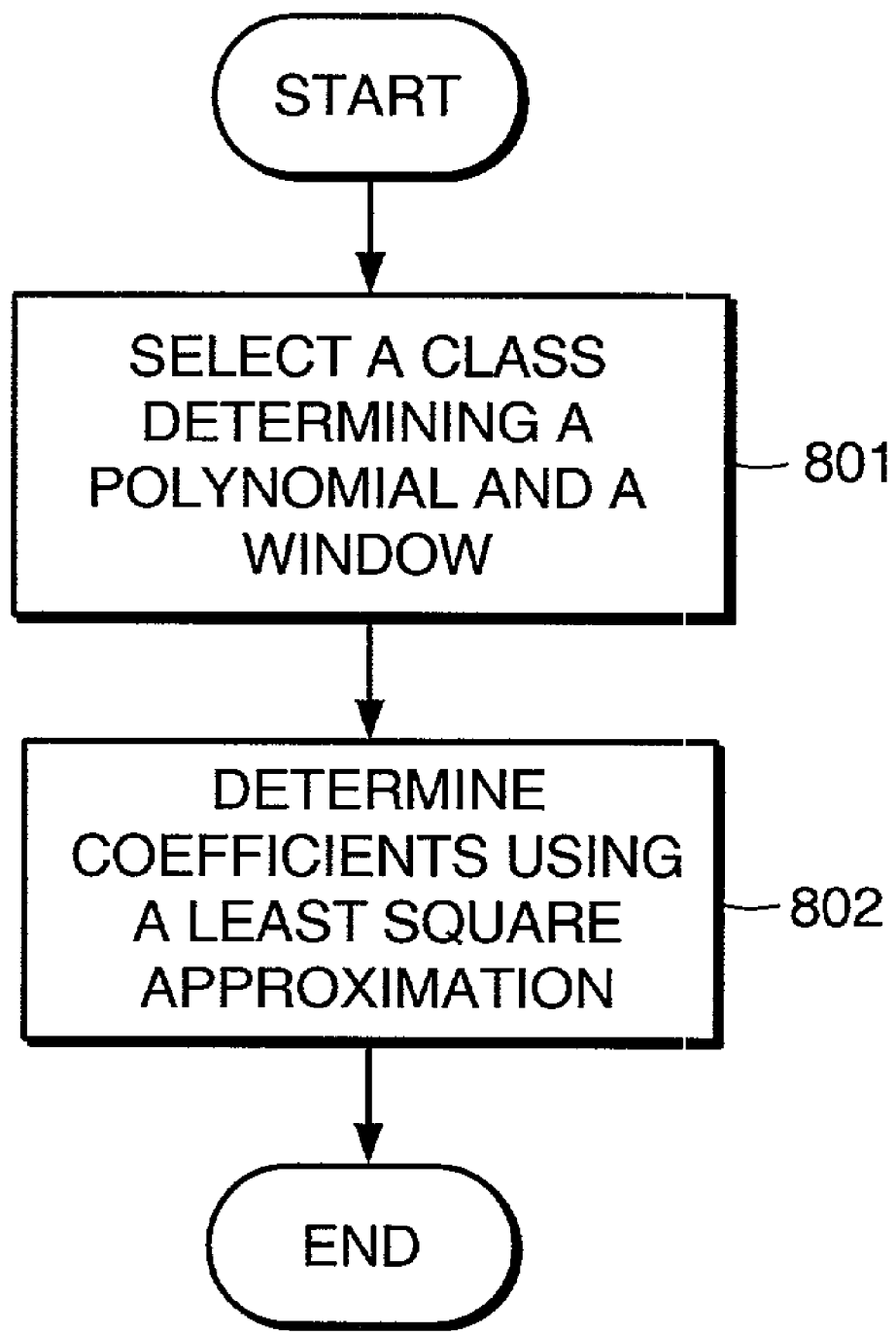
FIG. 8 is a flow chart further elaborating the step of determining the coefficient values of the polynomial from FIG. 4.

FIG. 8 is a flow chart further elaborating the step of determining the coefficient values of the polynomial from FIG. 4. The gradient is first calculated applying the above equations and using the defined window around point z as described above. The direction and the magnitude of the gradient are used to determine the polynomial that will be fit to the source data in the vicinity of z. Each possible gradient vector is identified with both a polynomial $P_z$ and another subregion $B_{ls}(z)\subset G$, where the coefficients of $P_z$ are estimated based on the source intensity data in $B_{ls}(z)$. In general, $B_{gr}(z)\subset B_{ls}(z)$, reflecting the fact that more data is needed to estimate the coefficients of the approximating polynomial than to estimate the gradient.

The possible gradient vectors are quantized into a discrete set of magnitudes and directions, wherein he quantization level is a parameter of the system. In one implementation, both the magnitude and the direction of the gradient are quantized into four possible values, yielding sixteen possible "classes" for the gradient vector $\nabla I_s(z)$ (Step 801). Let these classes be denoted by c=1, . . . 16. Each class c is assigned both a polynomial $P_c$ and a window $B_{ls}(c)$. It should be understood that through the quantization of the direction of the gradient the selected polynomial has an order which is larger in the direction which is substantially equivalent to the gradient and smaller order in the direction which is substantially orthogonal to the gradient. See FIG. 9 which is a sample look-up table showing the magnitude and direction of the gradient and the associated class number as well as the polynomial and the coefficient window size. The polynomial and window assigned to location $z \in G'$ are then represented as $P_c$ and $W_c$, where $c=c(\nabla I_s(z))$. The size and shape of the window, as well as the form of the polynomial, depend of the magnitude and the direction of $\nabla I_s(z)$. Generally speaking, the larger the magnitude, the larger the window. This is necessary because large magnitudes represent substantial changes ("activity") in the vicinity of z, and hence a more complex polynomial is required to capture the intensity profile. As the magnitude increases, so does the maximum degree of the polynomial, but the structure, i.e., the choice of c, depends critically on the direction of the gradient as well. In order to approximate the intensity surface with high accuracy, it is necessary to smooth less in the direction of $\nabla I_s(z)$. For example, if the direction of $\nabla I_s(z)$ were vertical, the degree of $P_c$ in the vertical (y) direction would be larger than in the horizontal (x) direction. The coefficients are then estimated using the intensity values within coefficient window $B_{ls}(c)$ through a least squares approximation for the polynomial $P_c$ (Step 802).

In order to illustrate these assignments, we consider two simple examples. For simplicity, suppose G is the integer lattice, i.e., $(x_i, y_j)=(i,j)$, that the closet point to z in G is (0,0), and that z is the lower right of (0,0).

Assume the gradient is the vector (w,0) and is assigned to a class which represents an intensity surface which is somewhat flat near z but with a mild inclination in the horizontal direction. The designated polynomial might then be $P_c(x, y)=A+Bx$, which is constant in the vertical direction (as smooth as possible) and linear in the horizontal direction. There are then two parameters to estimate, namely A and B. In this case, the window $B_{ls}(c)$ determined by $\nabla I_s(z)$ might simply be the two points $\{(0,0),(1,0)\}$. For larger values of w, the polynomial chosen might be $P(x,y)=A+Bx+Cx^2$ or $P(x,y)=A+Bx+Cy+Dx^2$ if the y-component of the gradient was non-zero but small compared with w. In these cases, the window $B_{ls}(c)$ would contain three or more points.

In another example, if instead the gradient vector is (w,w), then the polynomial might be first degree in both x and y, for instance $P_c(x,y)=A+Bx+Cy$, and the window might be taken as $B_{ls}(c)\{(0,0),(1,0),(0,1)\}$. A larger magnitude might be assigned the polynomial $P_c(x,y)=A+Bx+Cy+Dx y, Ex^2+Fy^2$, where again the amount of smoothing in the x and y directions is the same.

As defined in Step 803 a least squares approximation is used to determine the coefficients. For a general polynomial $P(x,y)$ in two variables, let $\alpha_{nm}$ denote the coefficient of the term $x^n y^m$, $n,m=0,1 \ldots$, and let A (P) denote the set of indices $(n,m)$ for which $\alpha_{nm} \neq 0$. The pixel defined by z is assumed to be fixed so that $c=c(z)$, the class assigned to the gradient $\nabla I_s(z)$, as explained above. The polynomial used to approximate the source data in the vicinity of z is then $$P_c(x, y; \vec{\alpha}) = \sum_{(n,m) \in A(P)} \alpha_{nm} x^n y^m$$

where $\vec{\alpha}$ denotes any ordering of the set $\{\alpha_{nm},(n,m) \in \alpha(P)\}$. The vector $\vec{\alpha}$ has $N(P_c)$ components where $N(P_c)=|A(P)|$. The set of locations used that will be utilized for estimating $\vec{\alpha}$ is $B_{ls}(z) \subset G$, where $B_{ls}$ depends only on c. The estimate of $\vec{\alpha}$ will be a function of the image values $\{I_s(i,j),(x_i,y_j) \in B_{ls}(z)\}$. In the remainder of the specification, the dependence on c from the notation will be dropped.

A quadratic cost is provided which is used for defining the simultaneous equations for the least squares approximation used to determine the coefficients as follows:

$$F(\vec{\alpha}; I_s) = \sum_{(x_i, y_j) \in B_{ls}} (P(x_i, y_j; \vec{\alpha}) - I_s(i, j))^2$$

The coefficients are chosen by minimizing F, which is a quadratic function of $\vec{\alpha}$. The partial derivatives of F is taken with respect to the components of a $\alpha$ leading to N(P) linear equations in the N(P) unknowns $\{\alpha_{nm}\}$:

$$\sum_{i,j} x_i^n y_j^m P(x_i, y_j; \vec{\alpha}) = \sum_{i,j} x_i^n y_j^m I_s(i, j), (n, m) \in A(P)$$

where the sums extend over all (i,j) for which $(x_i,y_j) \in B_{ls}$. This can be rewritten in matrix form as $$\Gamma \vec{\alpha} = \vec{\beta},$$

where $\Gamma$ is an $N(P) \times N(P)$ matrix constructed from the powers $\{x_i^n y_j^m\}$, but is independent of the source data, and $\vec{\beta}$ is an N(P) dimensional vector which constructed from inner products between the source intensity values $\{I_s(i,j), (x_i,y_j) \in B_{ls}\}$, and the components of P.

Depending on the relative sizes of N(P), the number of non-zero coefficients of P, and the $N(B_{ls})$, the number of points in $(B_{ls})$ there are two generic cases for determining a solution to the simultaneous equations. The first is if $N(P) = N(B_{ls})$. If this is true then there is a unique interpolating polynomial, meaning that the coefficients of P are uniquely determined by the source data and this polynomial coincides with $I_s$ on $B_{ls}$, i.e. $P(x_i,y_j)=I_s(i,j)$ for each $(x_i,y_j) \in B_{ls}$. In the alternative case, if $N(P)<N(B_{ls})$, then (in general) there is no interpolating polynomial since the number of constraints exceeds the number of degrees of freedom. In this case, the image data is "smoothed" in the sense that the approximating polynomial is smoother than the intensity surface in the vicinity of z.

In one implementation, interpolating polynomials are used therefore $N(P)=N (B_{ls})$. In the alternate, but more complex, implementation, the choice of the type of approximation can depend on the behavior of the image in the vicinity of z, allowing either smoothing or interpolating polynomials depending on the nature of the data and the time constraints. In cases in which very fast reformatting is required, the smoothing might be preferred. Finally, the new image value at location $z=(x'_i,y'_j) \in G'$ is then $I_d(i,j)=P(x'_i,y'_j; \vec{\alpha})$ where $\vec{\alpha}=\Gamma^{-1} \vec{\beta}$. This process is carried out for every element of $z \in G'$, thus resulting in the construction of the destination image $I_d=\{I_d(i,j),(x'_i,y'_j) \in G'\}$.

At each location of z there is a system of N ($P_c$) linear equation to solve in $N(P_c)$ unknowns, where the subscript c depends on the location of z through the gradient there. Consider the matrix equation from above $\vec{\alpha} \Gamma = \vec{\beta}$, with the dependence on z explicitly incorporated, the equation may be rewritten so as to solve for the coefficients, $\vec{\alpha}_z=\Gamma_z^{-1}\vec{\beta}_z$. The matrix $\Gamma_z^{-1}$ depends on the set of powers $(x_i^n y_j^m)$ for $(x_i,y_j)\in B_{ls}(z)$ while the vector $\vec{\beta}_z$ depends on both the powers and the source intensity values in the vicinity of z. Thus, the vector $\vec{\alpha}_z$ depends only on the class c(z) of the polynomial assigned to the estimated gradient $\nabla I_s(z)$, and as a result, it may be assumed that z is at some fixed reference location, say $z_0\in G'$. The polynomial which approximates the source intensity data in vicinity of a point $z\in G'$ will be a simple translation of the polynomial which approximates the same intensity surface in the vicinity of any other point in G'. Since the matrix $\Gamma$ is independent of the intensity data and also independent of the coordinate system assigned and only dependent upon the relative spacing, the inverse can be computed off-line and stored thus providing an improvement in efficiency to the method. There is then one matrix $\Gamma$ for each type of window $B_{ls}$, independent of its actual location. The size and shape of the window depends on the category of the gradient as well as the position of z relative to its nearest neighbor in G. It should be understood by one of ordinary skill in the art that other improvements in computational efficiency may be achieved using the foregoing method. For example, additional points in the new format defining the destination image may be calculated based upon the determined polynomial for a given window without recalculating the gradient, determining the polynomial, and calculating the coefficients. For instance, if two points in the new format reside within the window which is used for defining the gradient, and the points within the window which are selected for calculating the gradient are the same including the nearest neighbor in G, then the same polynomial and coefficients may be used to calculate the intensity value(s) associated with both points. It should be clear that this computational gain in efficiency is dependent on the size of the selected windows. Further, the efficiency is proportional to the number of source image intensity values which are within the selected window.

Figure 10:
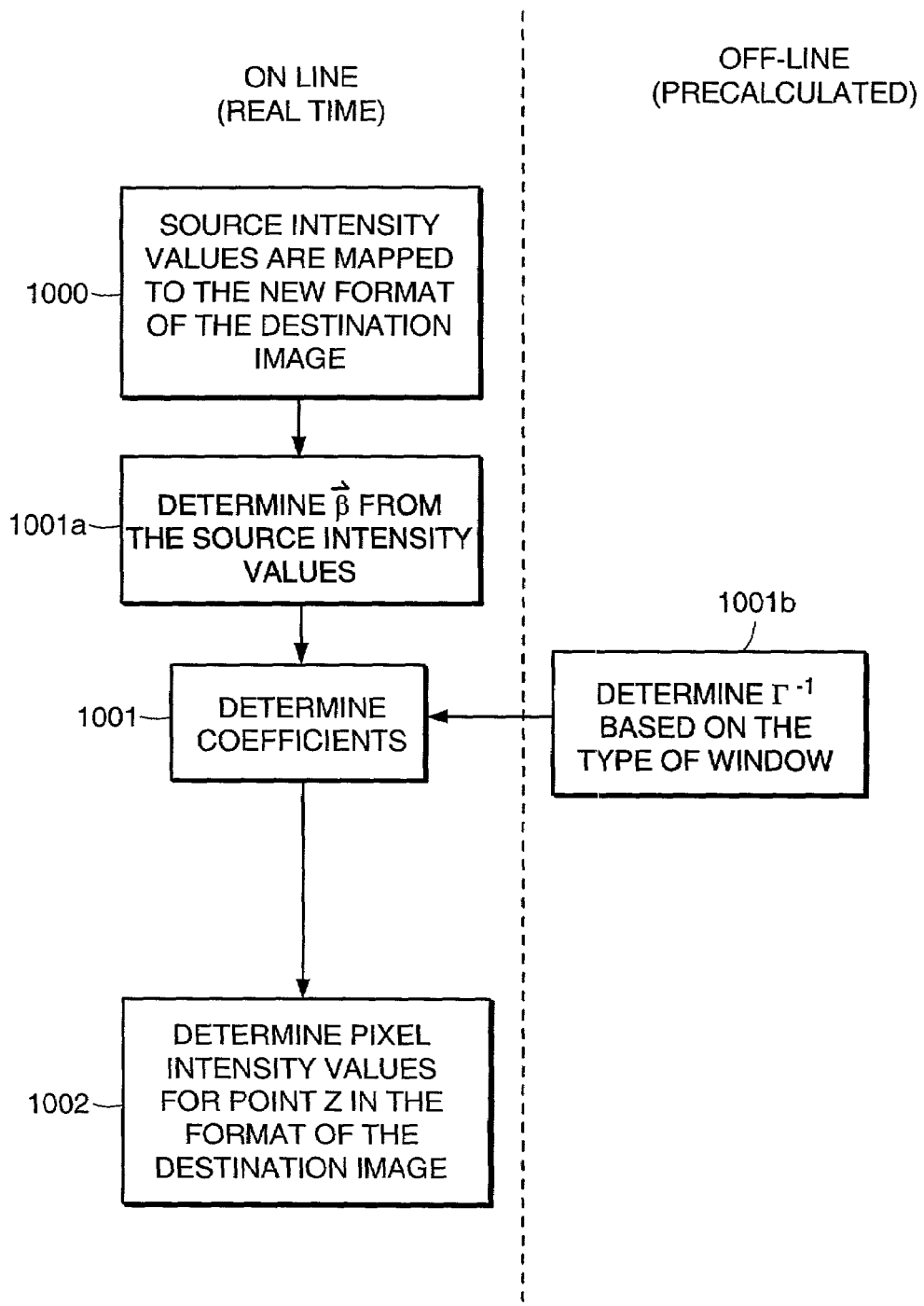
FIG. 10 is a flowchart which characterizes the steps for determining the intensity values for a point z as occurring either on-line or off-line.
Figure 11:
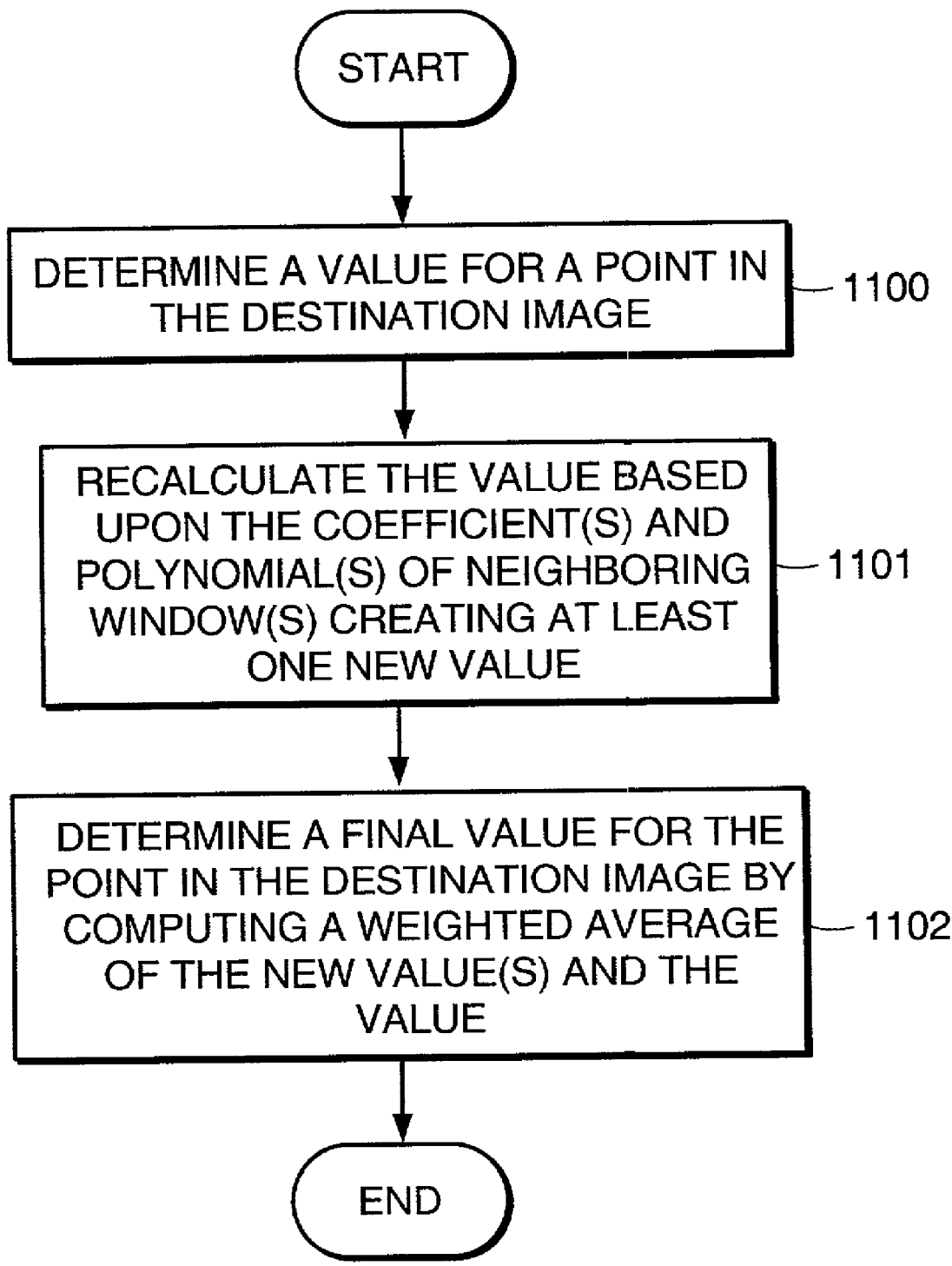
FIG. 11 is a flow chart explaining an alternative method for calculating an intensity value for a point in the destination image.

The value of the destination image at a point z is then computed as shown in FIG. 10. In step 1000, the source intensity values in G' for the grid points in the neighborhood $B_{ls}(z_0)$ of the reference point $(z_0)$ are determined by translating the values from the neighborhood $B_{ls}(z)$. The coefficients of the polynomial $\vec{\alpha}=\Gamma^{-1}\vec{\beta}$ for the appropriate choice of $\Gamma^{-1}$ and for $\vec{\beta}$ depending on the source data is then computed step 1001. As shown in FIG. 10 the process of calculating $\Gamma^{-1}$ 1001a is performed off line while the matrix of $\vec{\beta}$ 1001b and the coefficients $\vec{\alpha}$ 1001 are calculated on-line. The grid point z of the new image is then assigned the intensity value $P(z;\vec{\alpha})$ step 1002. This is then continued until all the points in the new image are defined. It should be understood by one of ordinary skill in the art that many of the steps described may be implemented in computer code and run on computer or in a processor.

What follows is as numerical illustration of the process of adaptive interpolation. Suppose the source grid is $G=\{(2i, 3j):1\leq i \leq C, 1\leq j\leq R\}$. The corresponding pixels are not square; their width-to-height ratio is $$\frac{\delta_x}{\delta_y}=\frac{2}{3}.$$

The aspect ratio $$\frac{W}{H}$$

of the corresponding scene is $$\frac{2C}{3R}.$$

The destination image is to have square pixels and dimension $2C\times 3R$; it has the same aspect ratio as the source, but with (nominally) twice the resolution in the horizontal direction and (nominally) three times the resolution in the vertical direction. The appropriate destination grid is then $G'=\{(i,j):1\leq i\leq C', 1\leq j\leq R'\}$ with $C'=2C, R'=3R$. These two grids are depicted in FIG. 7. In this case $G\subset G'$, although this need not always be the case, even for upconversion in both directions.

Consider defining the destination image at the location $z=(x'_i,y'_j)=(4,7)\in G'$; see FIG. 7. Notice that z does not belong to G, although the interpolation process would be no different if it did. The gradient $\nabla I_s(4,7)$ is estimated based on the source values in $B_{gr}=\{(4,6),(6,6),(4,9)\}$; the estimated gradient is $\nabla I_s(4,7)=(I_s(6,6)-I_s(4,6), I_s(4,9)-I_s(4,6))$. Suppose, as in a previously described example the estimated gradient is $(w,0)$ and the corresponding class c is identified with the polynomial $$P(x,y)=\alpha_{00}+\alpha_{10}x+\alpha_{20}x^2. \text{ Thus } \vec{\alpha}=(\alpha_{00},\alpha_{10},\alpha_{20}) \text{ and}$$
$$N(P)=3. \text{ With } B_{ls}=B_{gr},$$

$$F(\vec{\alpha};I_s)=(\alpha_{00}+4\alpha_{10}+4^2\alpha_{20}-I_s(4,6))^2$$

$$+(\alpha_{00}+6\alpha_{10}+6^2\alpha_{20}-I_s(6,6))^2$$

$$+(\alpha_{00}+4\alpha_{10}+4^2\alpha_{20}-I_s(4,9))^2$$

Minimizing F with respect to $\alpha$ is equivalent to solving the linear system $$\Gamma\vec{\alpha}=(\beta_0,\beta_1,\beta_2)$$

where $\Gamma$ is a $3\times 3$ matrix constructed from the coordinates $\{(x_i,y_j)\in B_{ls}\}$; in this particular case this only involves the three x-coordinates, namely $(x_1,x_2,x_3)=(4,6,4)$. The components of $\vec{\beta}$ are inner products involving the source intensity values:

$$\beta_k=<(x_1^k,x_2^k,x_3^k),\vec{I}_s>, k=0,1,2,$$

$$\text{where } \vec{I}_s=(I_s(4,6),I_s(6,6),I_s(4,9)).$$

The destination image at z is defined as $I_d(4,7)=P(4,7)=\alpha_{00}+4\alpha_{10}+16\alpha_{20}$, where $\vec{\alpha}=\Gamma^{-1}\vec{\beta}$. The computation would be exactly the same for any other location z which has the same relative position in the grid G, and hence lies directly below a point in G, i.e., for all pixels in G with coordinates of the form $(2i,3j+1)$. For example, suppose $z=(8,10)$. The relevant source image values are then $I_s(8,9)$, $I_s(10,9), I_s(8,12)$. If the gradient $I_s$ at $(8,10)$ belongs to the same class as the gradient at $(4,7)$, and if we replace the source intensity values at $(4,6),(6,6),(4,9)$ by those at $(8,9)$, (10,9),(8,12), we can use the same matrix Γ as above. Only β changes. The destination image at z is then defined to be $I_d(8,10)=P(4,7)$.

Finally, the computation would be analogous for any other location in z∈G', depending on where z falls in the grid G. There are in fact six generic cases to consider, leading to six different matrices Γ for each class c. (In general, in pure upconversion, the number of cases is the number of grid points G' covered by each pixel in G.) All of these inverses can be computed and stored once the grids G and G' are fixed.

The polynomial class c(z) may change rather abruptly from location to location. The result is that the destination image has visible seams and a generally "blotchy" appearance. In another embodiment, the final intensity value at point z is first determined as described above (Step 1100). At least one new value for the point z is calculated based upon coefficients and polynomials of neighboring windows to the point of z (Step 1101). The final value of z is the determined through a weighted average of the value determined $P_{c(z)}$ and the new values calculated from the polynomials identified with locations in the vicinity of z (Step 1102). Let $P^*_z$ denote this weighting for the location of z. The smoothed destination image at z is then $P^*_z(x'_i,y'_j)$. Since averaging is linear, the coefficients of $P^*_z$ remain linear in the data.

In an alternative embodiment, the disclosed method for format conversion may be implemented as a computer program product for use with a computer system as described above. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in an number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a compute program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for reformatting a digital source image having a number of pixels defining an original format to a destination image in a new format having a number of pixels, wherein the number of pixels of the new format is greater than the number of pixels in the original format, the method comprising:
    upconverting the number of pixels in the original format to the number of pixels in the new format using adaptive filtering;
    wherein the adaptive filtering is an anisotropic approximation.

2. A method for reformatting a digital source image having a number of pixels defining an original format to a destination image in a new format having a number of pixels, wherein the number of pixels of the new format is greater than the number of pixels in the original format, the method comprising:
    upconverting the number of pixels in the original format to the number of pixels in the new format using adaptive filtering;
    wherein the adaptive filtering is both a space-variant approximation and an anisotropic approximation.

3. A method for reformatting at least a portion of a digital image in an old format to a converted image having a new format wherein the digital image and the converted image have the same reference system, wherein the digital image has dimensions of length and width, the digital image has an aspect ratio, and the digital image having a plurality of intensity values representative of an image, the method comprising:
    normalizing the aspect ratio of the digital image to that of the new format; defining a window of points encompassing a plurality of intensity valves from the digital image;
    estimating a gradient at a point within the window wherein the gradient has a magnitude and a direction;
    selecting a polynomial to represent the estimated gradient,
    estimating coefficients associated with the polynomial; and
    determining a value for the point in the new format within the window based upon the polynomial and the coefficients.

4. The method according to claim 3, further comprising: quantizing the value.

5. The method according to claim 3, wherein the order of the polynomial is larger, substantially in the direction of the gradient and smaller in the direction substantially orthogonal to the gradient.

6. The method according to claim 3, wherein values are calculated for all points within the new format by repeating the acts of defining a window, estimating a gradient, selecting an ordered polynomial, estimating coefficients, and determining a value wherein in the step of defining a window a new window is defined.

7. The method according to claim 3, further comprising defining a second window wherein the coefficients are calculated based on the intensity values in the second window.

8. The method according to claim 3, wherein in defining a window, the window contains at least three points having associated intensity values.

9. The method according to claim 3, wherein estimating a gradient is achieved using at least three points having associated intensity values.

10. The method according to claim 3, wherein the polynomial selected for a window is used to determine values in the new format for all points within the window.

11. The method according to claim 6, wherein for each point, the value in the new format is recalculated based upon coefficients and polynomials determined at other points.

12. The method according to claim 6, wherein the value of each point in the new format is recalculated using the coefficients and polynomial determined at least at one other point in the new format to determine a new value for the point and an average of the new value and the value is taken.

13. A computer program product for use on a computer system for reformatting a digital image having a number of pixels defining an original format to a new format having a number of pixels, wherein the number of pixels of the new format is greater than the number of pixels in the original format, the computer program product comprising a computer usable medium having computer readable program code thereon, the computer readable program code comprising:
   computer code for upconverting the number of pixels in the original format to the number of pixels in the new format using adaptive filtering;
   wherein the adaptive filtering is an anisotropic approximation.

14. A computer program product for use on a computer system for reformatting a digital image having a number of pixels defining an original format to a new format having a number of pixels, wherein the number of pixels of the new format is greater than the number of pixels in the original format, the computer program product comprising a computer usable medium having computer readable program code thereon, the computer readable program code comprising:
   computer code for upconverting the number of pixels in the original format to the number of pixels in the new format using adaptive filtering;
   wherein the adaptive filtering is both a space-variant approximation and an anisotropic approximation.

15. A computer program product for use on a computer system for determining a value for a point in a destination image having a new format from a source image in an old format wherein the destination image and the source image have the same reference system, wherein the source image has an aspect ratio and the source image is having a plurality of digital data representative of an image, the computer program product comprising a computer usable medium having computer readable program code thereon, the computer readable program code comprising:
   computer code for normalizing the aspect ratio of the source image to that of the new format;
   computer code for defining a window of points encompassing a plurality of digital data in the source image;
   computer code for estimating a gradient at a point within the window;
   computer code for selecting an ordered polynomial to represent the estimated gradient; and
   computer code for determining at least one value for the point in the window representative of the new format based upon the polynomial.

16. The computer program product according to claim 15, wherein the order of the polynomial is larger in the direction of the gradient and smaller in the direction orthogonal to the gradient.

17. The computer program product according to claim 15, wherein a second window is used and the coefficients are calculated based on digital data in the second window.

18. A computer program product according to claim 15, further comprising: computer code for continuing to re-execute the computer code for defining a window, the computer code for estimating a gradient, the computer code for selecting an ordered polynomial, and the computer code for determining at least one value for a point within the window, until all points in the new format have associated values.

19. A computer program product according to claim 15, wherein the computer code for defining a window defines a new window upon each re-execution.

20. The computer program according to claim 18, wherein for all points from the new format within the window the value for each point is determined using the same polynomial.

21. The computer program according to claim 18, wherein for each point from the new format the value associated with that point is recalculated based upon coefficients of a polynomial determined at least one other point.

22. The computer program according to claim 18, wherein the at least one value of each point is recalculated using the coefficients and polynomials determined in other windows to determine a new value for the point by averaging the new value and the value.

23. The computer program product according to claim 15, further comprising:
   computer code for determining coefficients of the polynomial based upon digital data from the source image.

24. The computer program product according to claim 23, wherein the computer code for determining coefficients further comprises computer code for selecting a second window containing digital data from the source image.

25. The method according to claim 3, wherein in defining a window, the size of the window is space-variant.

26. The method according to claim 25, wherein the size of the window is smaller for proximate intensity values having a low frequency of change.

27. A method for reformatting at least a portion of a digital source image having a number of pixels defining an original format to a destination image in a new format having a number of pixels, wherein the number of pixels of the new format is greater than the number of pixels in the original format, the method comprising:
   estimating a gradient at a point within a window, the window encompassing a plurality of intensity values from the source image; and
   using a polynomial to determine a value for the point in the new format within the window, the polynomial being based on the gradient.

* * * * *